Figure 1:
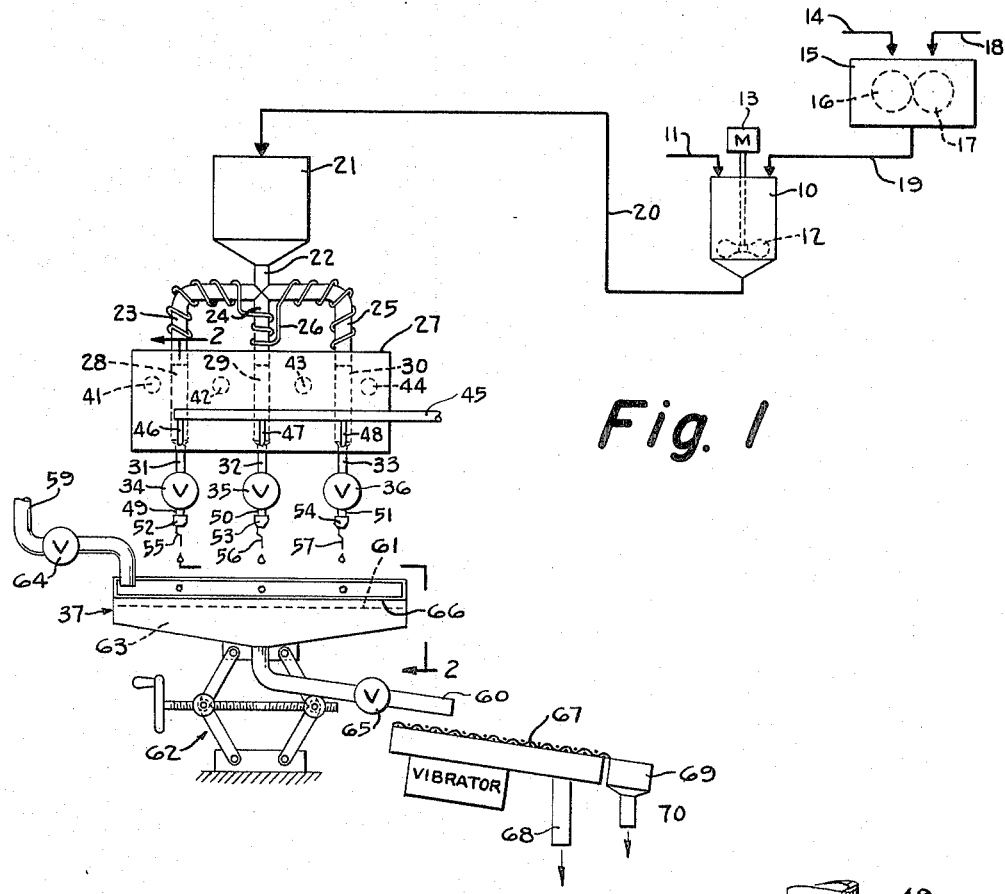

March 22, 1966     S. G. BELAK ETAL     3,242,237

METHOD OF PREPARING SLOW RELEASE FERTILIZER PARTICLES

Filed Sept. 11, 1963

INVENTORS
STEVEN G. BELAK
ROBERT H. CAMPBELL
BY
George L. Church
ATTORNEY

United States Patent Office 3,242,237
Patented Mar. 22, 1966

3,242,237
METHOD OF PREPARING SLOW RELEASE
FERTILIZER PARTICLES
Steven G. Belak, Claymont, Del., and Robert H. Campbell, Brookhaven, Pa., assignors to Sun Oil Company, Philadelphia, Pa., a corporation of New Jersey
Filed Sept. 11, 1963, Ser. No. 308,181
6 Claims. (Cl. 264—13)

This invention relates to a method of forming discrete slow release fertilizer particles. Each of the discrete particles comprises a dispersion of one or more solid fertilizer compounds in solid wax and they are formed from a fluid fertilizer composition comprising a dispersion of solid fertilizer in molten wax by dropping the latter into water in the form of droplets. Upon contact with the water the droplets of the fluid composition immediately solidify in particle form and the resulting particles are then separated from the water. The invention also embraces an apparatus useful in practicing the method of the invention.

The need for slow release fertilizers is well known. A slow release fertilizer is resistant to leaching by water and releases nutrients to the soil at a predetermined rate irrespective for the most part of soil and climatic conditions such as the amount of rainfall. Various methods of improving the water resistance of fertilizers are known. One such method involves dispersing the solid fertilizer in molten wax, forming the dispersion into small discrete particles by means of, say, a pellet mold, and cooling the particles to a temperature below the melting point of the wax. The resulting particles are a dispersion of solid fertilizer particles in solid wax. Each fertilizer particle is substantially completely surrounded by and encased in solid wax. The fater resistance of the fertilizer particles can be increased or decreased by increasing or decreasing the amount of wax employed. Increased water resistance can also be effected by dissolving certain additives in the molten wax.

One difficulty in preparing discrete fertilizer particles as described above is the lack of a completely satisfactory method of forming the initial dispersion of solid fertilizer in molten wax into discrete particles. Although a conventional type of pellet mold can be used for this purpose a pellet mold has the disadvantage that the wax sometimes tends to stick to the mold. Consequently it is sometimes difficult to remove the solid fertilizer particles from the mold. Other methods which can be used to form the initial dispersion into small particles also have disadvantages.

We have now found a novel method of preparing slow release fertilizer particles comprising a dispersion of solid fertilizer particles in solid wax. Our method involves forming a fluid dispersion of the fertilizer in molten wax and then dropping such dispersion in the form of droplets into water. As each droplet of the fluid dispersion contacts the water it immediately solidifies and becomes a solid particle comprising a dispersion of solid fertilizer in solid wax.

Figure 2:
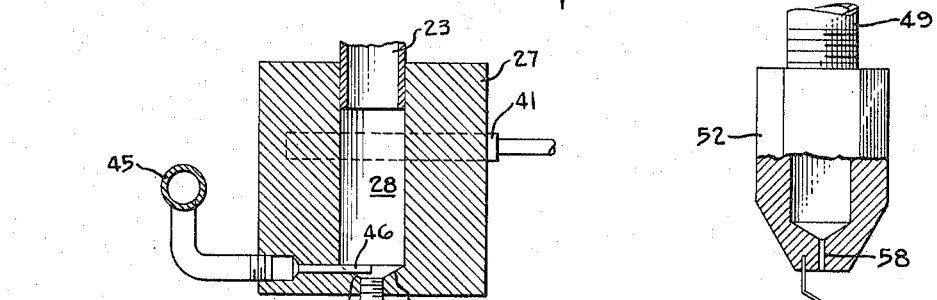
Figure 3:
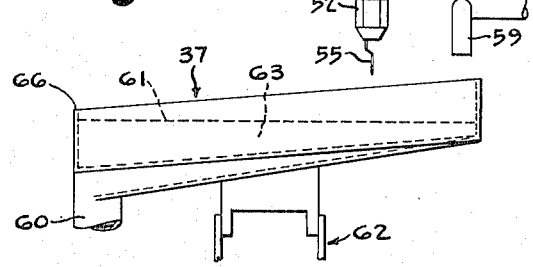

The method is described in more detail with reference to FIGURES 1, 2, and 3. FIGURE 1 illustrates one embodiment of the invention while FIGURES 2 and 3 are enlarged views of certain portions of the apparatus shown in FIGURE 1.

The wax component of the slow release fertilizer is charged to mixing tank 10 through line 11. Mixing tank 10 can be any conventional agitated vessel. It is equipped with an agitator 12 driven by motor 13 and with heating means not shown such as steam coils. After being charged to mixing tank 10 the wax is heated until it is molten. The wax can be of any type, e.g., animal, vegetable, or mineral wax, but is preferably a petroleum wax, i.e., paraffin wax or microcrystalline wax. More preferably the wax is paraffin wax. Paraffin waxes generally have a melting point of 110–165° F. (ASTM D127) a penetration at 77° F. of 5–25 dmm. (ASTM D1321–10.0 g., 5 sec.) and a viscosity at 210° F. of 30–50 S.U.S. (ASTM D446). Corresponding properties of the microcrystalline waxes are 140–210° F., 5–25 dmm., and 60–100 S.U.S., respectively.

The solid fertilizer component of the slow release fertilizer is obtained from a source not shown and is charged via line 14 to size reduction unit 15. The purpose of size reduction unit 15 is to subdivide the fertilizer particles to a small size, preferably smaller than 100 mesh, more preferably smaller than 200 mesh. (All mesh sizes are by U.S. Standard sieves.) This is desirable for several reasons. One, it is desirable that each of the ultimate fertilizer particles be of uniform composition throughout so that the rate of release of the fertilizer ingredients to the plants will be uniform. Since the particles are a dispersion of solid fertilizer in solid wax the uniformity of each particle increases as the particle size of the solid fertilizer contained therein decreases. Secondly, the method of the invention involves forming a fluid dispersion of solid fertilizer in molten wax and then subsequently processing this dispersion into discrete particles. If the solid fertilizer particles are relatively large they sometimes tend to settle out of the fluid dispersion and plug lines, equipment, etc. in the subsequent processing. Hence for this reason also it is desirable that the fertilizer particle size be small.

Size reduction unit 15 can be any type of apparatus conventionally used for this purpose such as a ball mill, roller mill, etc. but is shown in FIGURE 1 as a roller mill having rollers 16 and 17.

The solid fertilizer can be any of the conventional solid fertilizers. Examples of those in frequent use at the present time are urea, ammonium nitrate, potassium chloride, mono and diammonium phosphate, calcium cyanamide, ammonium sulfate, sodium nitrate, potassium phosphate, potassium nitrate, potassium sulfate, superphosphate (a mixture of calcium acid phosphate and calcium sulfate), and triple superphosphate (calcium acid phosphate). If the slow release fertilizer is to be a nitrogen fertilizer it will contain only a source of nitrogen. In most cases, however, the slow release fertilizer will be a complete fertilizer in which cases the solid fertilizer ingredient used in the invention will be a blend of a plurality of fertilizer compounds containing nitrogen, potassium, and phosphorus. For either type of fertilizer urea is a preferred source of nitrogen because it contains a higher percentage of nitrogen than the other fertilizers mentioned.

If any solid additives are to be included in the wax phase of the fertilizer composition they are charged to size reduction unit 15 through line 18. The additives can be subdivided separately from the fertilizer solids or simultaneously therewith. In the latter event the discharge from size reduction unit 15, indicated by line 19, will be a mixture of the solid fertilizer and the additives.

The fertilizer and additive solids discharged from size reduction unit 15 through line 19 are charged to mixing tank 10 containing molten wax. The mixture is stirred until the fertilizer solids are uniformly dispersed in the molten wax and until the additives have dissolved in the wax. In many cases it will be desirable to heat the wax to about 240–250° F. to promote the dissolution of the additives therein, although care must obviously be exercised to insure that the temperature in tank 10 does not exceed the decomposition temperature of any of the fertilizer solids present. Urea, for example, begins to decompose at about 270° F. Once the additives have dissolved the temperature of the wax phase is preferably reduced to slightly (e.g., 10° F.) above the melting point of the wax.

Rather than subdividing the additives prior to charging same to tank 10 they can be charged to tank 10 directly. In fact, in the case of liquid additives direct addition to tank 10 is preferred. In the vast majority of cases, however, the additives employed are solids and the time required to effect their dissolution in the wax is greatly decreased if they are preliminarily subdivided as shown in FIGURE 1.

The relative amount of fertilizer solids, wax, and any additives employed can vary rather widely and will depend mainly upon the soil and climatic conditions at the location of actual use of the ultimate fertilizer composition. As the ratio of fertilizer solids to wax phase increases, the wax phase being the wax plus any additives dissolved therein, the water resistance of the ultimate fertilizer particles decreases. In areas of relatively heavy rainfall the fertilizer should have a relatively high water resistance and the amount of the wax phase should therefore be relatively high. Similarly, in relatively dry areas the amount of wax phase should be relatively low. In most cases, however, the total amount of fertilizer solids will be a major amount, i.e., over 50%, and the amount of wax phase will be a minor amount, i.e., less than 50%, the amounts being based on the total composition weight, although lower amounts of fertilizer solids and higher amounts of wax phase can also be used. Usually the amount of fertilizer solids will be 50–80%, more frequently 50–70% and the amount of wax phase will be 15–49%, more frequently 25–49% based on the total composition. All percentages herein are by weight. As mentioned previously urea is a preferred source of nitrogen. Where urea is used the amount of same in the comparison can vary rather widely. In the case of a nitorgen fertilizer the amount will normally be as described above, i.e., a major amount, usually 50–80%, more frequently 50–70%. In the case of a slow release fertilizer containing a plurality of essential elements the total amount of fertilizer solids will still usually be a major amount but the amount of urea may be quite small. For example a slow release 5–15–10 complete fertilizer, i.e., a fertilizer containing 5% nitrogen as N, 15% phosphorus as $P_2O_5$, and 10% potassium as $K_2O$ might contain 10.7% urea, 32.6% triple super-phosphate, and 18.5% potassium sulfate, and 38.2% was phase. Normally the amount of urea, or the amount of any other single fertilizer ingredient will not be less than 5%, usually it will be at least 10%, more frequently at least 20%.

As mentioned previously various additives can be dissolved in the wax phase of the fertilizer composition in order to improve the water resistance of the composition or to effect other benefits. In a copending application, Serial No. 308,251, filed concurrently herewith, two additives, rosin and asphalt, have been disclosed as being effective for improving the properties of certain types of slow release fertilizers which comprise a dispersion of solid fertilizer in solid petroleum wax. The addition of rosin to the wax component of a urea-petroleum wax slow release fertilizer improves the water resistance thereof. The rosin can be wood, gum, or tall oil rosin and can be unmodified rosin or modified rosin, i.e., any of the various rosin derivatives such as hydrogenated rosin, polymerized rosin, metal salts of rosin, glycerol ester of rosin, etc. The amount of rosin employed should be a minor amount based on the total wax phase, i.e., wax and rosin. Preferably the amount of rosin is 2–35%, more preferably 3–25%. Also for a urea-petroleum wax slow release fertilizer, the incorporation of asphalt, in addition to rosin, into the wax component thereof effects a further improvement in the fertilizer water resistance. The amount of asphalt should be a minor amount based on the total wax phase, i.e., wax, rosin, and asphalt. Preferably the amount of asphalt is 0.25–20.0%, more preferably 1–20. When asphalt is used to improve the fertilizer water resistance, in which case rosin will also be present, the amount of rosin should be as described above, i.e., a minor amount, preferably 2–35%, more preferably 3–25%, except that the amounts and percentages are based on the total wax phase which now is wax, rosin, and asphalt.

Also disclosed in the aforesaid copending application is the incorporation of asphalt into the wax phase of a dispersion of solid fertilizer in molten wax in order to improve the fluidity of the dispersion. It will be found that when a major amount of solid fertilizer of relatively large particle size is dispersed in molten petroleum wax the resulting dispersion is generally fluid, i.e., it will take the shape of its container, can be poured, etc. If, however, the fertilizer particle size is smaller than about 120 mesh a dispersion of a major amount of the fertilizer in a minor amount of petroleum wax has a putty-like consistency, i.e., it is unflowable, unfluid, etc. Apparently the fertilizer adsorbs the wax phase onto the surface of the particles, any unadsorbed wax being insufficient in amount to render the dispersion fluid. If asphalt is added to such a dispersion, however, the fluidity thereof is substantially increased. The amount of asphalt used to effect this beneficial result should be 2–20%, preferably 3–10, by weight of the wax. While asphalt improves the fluidity of any dispersion of a major amount of fertilizer in a minor amount of petroleum wax, actual fluidity is obtained at certain fertilizer contents of 50–80%. In the case of a dispersion containing a major amount of urea actual fluidity is obtained when the urea content is about 53–65%, i.e., urea=53–65%, balance of the dispersion is wax phase. With potassium chloride actual fluidity is obtained at about 60–70% KCl. In the case of potassium sulfate actual fluidity is obtained at about 70–80% $K_2SO_4$. With diammonium phosphate actual fluidity is obtained at about 55–65%. With super and triple superphosphate actual fluidity is achieved at about 60–70%. With mixtures of fertilizers the amount of the mixture at which actual fluidity is achieved is about what would be expected by interpolation between the appropriate amounts for the individual fertilizers.

Any type of asphalt can be used for the purposes described above, i.e., to fluidize the dispersion or to improve the water resistance of the resulting fertilizer particles. Normally the asphalt will have a softening point of 50–350° F. (ASTM D30–26) and a penetration at 77° F. of 0–300 mm. (ASTM D5–47. 100 g., 5 sec.).

A fluid dispersion of solid fertilizer in molten wax can, of course, be obtained by other means than that specified above, i.e., by means other than incorporating asphalt into the wax phase in conjunction with the specified major amount of solid fertilizer. One other means is to use fertilizer solids of particle size larger than about 120 mesh, preferably a particle size of 60–80 mesh. Another means of obtaining a fluid dispersion of solid fertilizer in molten wax is to increase the amount of wax in the dispersion. For example, a dispersion containing 30% urea and 70% wax is fluid even when the urea particle size is smaller than 200 mesh.

When the solid fertilizer includes urea and the wax used is a paraffin wax it is desirable to add an additive to prevent the urea from reacting with the paraffin wax to form the well known urea-paraffin wax adduct. If such reaction occurs in a dispersion containing more than 50% urea, the entire dispersion becomes a solid having about the texture of wet sand. Suitable additives which when incorporated into the paraffin wax prevent the adduction reaction from occurring are microcrystalline wax; wax soluble vinyl polymers such as polyethylene, poly(vinyl chloride), polylaurylmethacrylate, polyindenes, polyterpenes, etc.; fatty acid amines; fatty acid amides;

rosin; etc. The amount of additive required to inhibit the adduction reaction varies somewhat depending upon the specific additive but is normally 0.1–10.0%. Preferably the amount is 1–10%, more preferably 3–10%. Urea also sometimes reacts with other waxes such as ozocerite wax to form an adduct. The additives mentioned also inhibit these adduct forming reactions. Where an additive is used to prevent adduction of the urea the additive is preferably dissolved in the wax prior to dispersing the urea therein.

The fluid dispersion formed in the manner described above is discharged from mixing tank 10 through line 20 and passes into supply tank 21. Supply tank 21 contains a discharge line 22 which branches into 3 discharge lines 23, 24, and 25. Each of the 3 discharge lines is provided with heating means 26 which can be a steam coil, heating wire, etc., and which prevents solidification of the fluid dispersion flowing through the 3 discharge lines. Each of the 3 discharge lines 23, 24, and 25 terminates within corresponding holes, indicated at 28, 29, and 30 in manifold block 27. In the operation of the apparatus fluid dispersion in supply tank 21 flows by gravity via lines 23, 24, and 25 through holes 28, 29, and 30 in manifold block 27, then through pipes 31, 32, and 33, then through valves 34, 35, and 36, then through nozzles 52, 53, and 54, and finally into a body of aqueous liquid, e.g., water, contained in water chamber 37. Valves 34, 35, and 36 are regulated so that the fluid dispersion drops into the water in droplet form.

Since the flow through the apparatus shown in FIGURE 1 is by gravity it is usually desirable to equip supply tank 21 with a level control device to maintain a constant level of fluid dispersion therein. This eliminates variations in flow rate through manifold block 27 caused by variations in the height of fluid dispersion in supply tank 21.

The flow of the fluid dispersion through manifold block 27 and the construction of the block is better illustrated by FIGURE 2 which is an enlarged cross section view along line 2—2 of FIGURE 1. With reference to FIGURE 2 manifold block 27 contains hole 28 which extends vertically from the top of block 27 to a point near its bottom. At the top of the block hole 28 is adapted to receive discharge line 23. Discharge line 23 should be screwed, welded, etc., into hole 28 so as to provide a tight fit and prevent leakage of the fluid dispersion as it flows therethrough. Hole 28 can be of any convenient size but will normally be on the order of about 1–2 inches inside diameter. Similarly discharge line 23 will normally have an outside diameter on the order of about 1–2 inches. The size of manifold block 27 can also vary but a block 5″ high and 5″ deep has been found satisfactory for use with hole 28 having a size as indicated above. The length of manifold block 27 will depend mainly upon the spacing of discharge lines 23, 24, and 25 therein and upon other factors mentioned hereinafter.

Hole 28 extends downwardly through manifold block 27 to a point near the bottom of the block where it is tapered, as shown by numerals 38 and 39, to meet pipe 31 which usually has an inside diameter on the order of ¼–⅜ inch and which is screwed or otherwise tightly fitted into the bottom of manifold block 27. Manifold block 27 is, of course, drilled out at its bottom to receive pipe 31. Hole 28 and pipe 31 thus provide passage for the flow of fluid dispersion through manifold block 27. The sides of hole 28 are, as described, tapered at the bottom to meet pipe 31. This is not necessary for the bottom of hole 28 could also be flat, i.e., parallel to the bottom edge of manifold block 27. Such an arrangement, however, tends to create dead spots at the bottom of hole 28 at which solid fertilizer in the fluid dispersion tends to build up. The use of a tapered surface tends to prevent this.

FIGURES 1 and 2 also show two additional features which improve the operation of the particle forming apparatus being described. As the fluid dispersion flows through manifold block 27 the wax phase thereof has a tendency to cool and collect on the sides of holes 28, 29, and 30 and pipes 31, 32, and 33. In order to prevent this block 27 is adapted to receive a plurality of heaters, such as plug type electric heaters, indicated at 41, 42, and 43 and 44. These heaters are adjusted to maintain the manifold block at a temperature above the solidification temperature of the fluid dispersion. The number of heaters required and their spacing will depend primarily upon such factors as the size of the block, the material it is constructed from, the spacing of holes 28, 29, and 30, etc. In some cases it will be desirable to provide heating means in supply tank 21 to avoid build-up of fluid dispersion on its sides. Whether or not this is required will depend mainly upon the flow rate through supply tank 21. Where heating means are required they can be steam coils, steam jacket, etc. In many cases merely insulating tank 21 will adequately prevent buildup.

Another feature shown in FIGURE 1 is the provision for bubbling nitrogen or other inert gas through the fluid dispersion as it passes through manifold block 27. Line 45 is a nitrogen supply manifold. It has 3 take-off lines, indicated at 46, 47, and 48 which pass into manifold block 27 and terminate at the center of the tapered portion of hole 28. The position of these nitrogen lines within block 27 is shown more clearly in FIGURE 2. The purpose of bubbling nitrogen through the fluid dispersion is to prevent the solid fertilizer portion of the dispersion from settling out and plugging up hole 28. The nitrogen bubbles up through holes 28, 29, and 30, then through discharge lines 23, 24, 25, and then through the contents of supply tank 21 after which is escapes to the atmosphere. Thus by bleeding nitrogen into the bottom of holes 28, 29, and 30 the fluid dispersion is agitated throughout most of the entire system.

Pipes 31, 32, and 33 terminate in petcocks, i.e., valves 34, 35, and 36, the purpose of the latter being to control the flow of fluid dispersion from supply tank 21. Attached to the discharge sides of petcocks 34, 35, and 36 are short lengths of pipe 49, 50, and 51, respectively, to which are attached nozzles 52, 53, and 54 respectively. Fluid dispersion flows through the petcocks, through the nozzles, and falls into a body of water positioned below the nozzles. Wires 55, 56, and 57 are positioned directly below the discharge of the nozzles. The use of wires 55, 56, and 57 is an optional but preferred embodiment of the invention. Nozzle 52 is shown in greater detail in FIGURE 3, the remaining nozzles being preferably the same as nozzle 52. With reference to FIGURE 3 nozzle 52 has a discharge indicated at 58 which is relatively small. Neglecting wire 55, which is an optional embodiment, in the operation of the apparatus petcock 34 (FIGURES 1 and 2) is throttled enough so that the fluid dispersion flowing through nozzle 52 drops off the end of the nozzle at discharge 58 in the form of small droplets. The droplets fall into a body of water and immediately solidify resulting in discrete solid fertilizer particles. The size of the solid particles will be about the same as the size of the droplets from which they are formed. There is a tendency for the droplets to flatten out upon impact with the water below but by adjustment of the height through which the droplets fall, discussed subsequently, this tendency to flatten out can be reduced to an inconsequential amount. In most cases the solid fertilizer particles should have a maximum dimension of not more than $3/16$ inch. Preferably the maximum dimension is about $1/16$ inch. Therefore the droplets should have a maximum dimension of not more than $3/16$ inch preferably about $1/16$ inch. To obtain a droplet having a maximum dimension of about $1/16$ inch, the diameter of nozzle discharge 58 should be about .03–.20 inch, usually about .05–.15 inch. The exact diameter within this range will depend mainly upon the viscosity and density of the fluid dispersion. At constant diameter, as the viscosity increases the droplet size increases and as the density increases the droplet size decreases. The viscosity and density being constant, the droplet size increases as the diameter of discharge 58 increases, at least within a range of about .03–.20 inch. In general, however, it will be found that the diameter of discharge 58 should be .03–.20 inch, usually .05–.15 inch.

As described wires 55, 56, and 57 are optional but preferred embodiments of the apparatus used in practicing the invention. Their position, function, etc. is best described with reference to FIGURE 3 which is an enlarged view of nozzle 52 containing wire 55. Wire 55 normally has a diameter of about 0.02 inch, i.e., piano wire size. One end of wire 55 is mounted securely into the bottom face of nozzle 52 offset slightly from nozzle discharge 58. Wire 55 extends downwardly from the nozzle face about ¼–½ inch and is then offset so that a further length of wire 55, about ½–1 inch, extends downwardly directly below nozzle discharge 58.

The purpose of wire 55 is to increase the number of droplets of fluid dispersion which can be obtained from nozzle 52. It has already been explained that without the use of wire 55 petcock 34 is throttled enough so that the dispersion leaves nozzle discharge 58 in the form of small droplets. The rate at which droplets fall from discharge 58 is often less than is desired, however. If petcock 34 is opened wider to increase the throughput it will be found that the fluid dispersion leaves discharge 58 as a solid continuous stream which when it contacts the body of water positioned therebelow results in spaghetti-like fertilizer particles. When wire 55 is employed, however, petcock 34 can be opened wide enough to permit a continuous stream to leave discharge 58 and drain down wire 55. Very shortly after the continuous stream drains off of wire 55 it disintegrates into small droplets which upon contact with the body of water below solidify to form fertilizer particles having substantially the same shape as the droplets. Of course, if petcock 34 is opened too much the flow rate of fluid dispersion down wire 55 will be so high that the dispersion will not disintegrate into droplets but will enter the water below as a single continuous stream, resulting in spaghetti-like fertilizer particles. However, with proper control of petcock 34 the use of wire 55 permits a much larger number of droplets to be formed than when wire 55 is omitted.

When using wire 55 the diameter of discharge 58 will normally be about the same size as described heretofore, i.e., about 0.03–0.20 inch. Good results are obtained when wire 55 is about 0.02 inch in diameter although wire 55 can have a larger or smaller diameter. In any event the diameter of wire 55 should be considerably less than the diameter of discharge 58. Increasing the diameter of wire 55 tends to increase the size of the resulting droplets while reducing the diameter has the opposite effect. In most cases a wire diameter of about 0.02 inch in combination with a .03–.20 discharge 58 diameter will result in solid fertilizer particles having a maximum dimension of about 1/16 inch.

As described the droplets of fluid dispersion which leave wire 55, or discharge 58 as the case may be, fall into a body of water 63 contained in water chamber 37. Body of water 63 does not have to be water per se but can be any aqueous liquid such as salt water, etc. It is pointed out subsequently that in some cases the water will intentionally contain a significant amount of fertilizer solids. Water chamber 37 is adapted to hold a body of water 63 and is made of any convenient structurally strong material such as steel, aluminum, etc. Water is continuously fed into water chamber 37 through water supply line 59 and water valve 64. Water is removed by gravity from the chamber by means of water chamber discharge line 60 and water valve 65 at essentially the same rate that water enters the chamber so as to maintain a constant water level, indicated by line 61, in the water chamber. Water chamber is mounted on scissors jack 62 so that the height through which the droplets fall can be varied, the reason for such variation being explained hereinafter.

The droplets of fluid dispersion falling from wire 55 fall into the body of water 63 which is maintained at a temperature below the solidification temperature of the dispersion, which solidification temperature will normally be essentially the same as the melting point of the wax. Since most waxes melt at 100–210° F. water at room temperature is generally adequate. It is desirable that the water temperature be substantially below the solidification temperature of the droplets so the solidification of the droplets occurs almost instantaneously with their entry into the water. Upon contact with the water the droplets immediately solidify resulting in small, discrete solid fertilizer particles. In the vast majority of cases the particles are heavier than water and sink to the bottom of water chamber 37. Water chamber 37 is shaped in such a manner that the solid particles drain out discharge line 60 along with the water being discharged through line 60. One suitable shape to effect this result is shown in FIGURES 1 and 2. The bottom of water chamber 37 is trough shaped so that the particles tend to collect at the center of the bottom of the chamber. In addition water chamber 37 slopes downwardly from back to front so that the particles also tend to collect at the front of chamber 37. Discharge line 60 is positioned at the lower point of the trough at the front of the chamber so that the particles drain to and fall by gravity through discharge line 60. Of course, the motion of the water entering the water chamber through line 59 and leaving through discharge line 60 also tends to sweep the solid particles out of the chamber through line 60.

If the solid fertilizer particles should be lighter than water, a very infrequent occurrence, they will float on the surface of body of water 63. In this case rather than removing water from the bottom of water chamber 37 water is allowed to overflow one side of chamber 37 which is made lower than the other sides. For example in FIGURE 1 if discharge line 60 was closed water would overflow chamber 37 over edge 66, and the flow of water would also carry the solid particles therealong. It should be noted that the situation where the fertilizer particles are lighter than water arises only infrequently. This is to be expected since most solid fertilizer compounds are enough denser than water so that in conjunction with the fact that most slow release wax fertilizers will contain more than 50% solid fertilizer they more than offset the normally less dense than water wax phase.

As mentioned above, the fact that the water in water chamber 37 is in motion helps to sweep the particles out of the water chamber through water discharge line 60. The motion of the water within chamber 37 also provides another benefit. In normal operation it will be found that the number of droplets which fall into the water from any wire, say wire 55, per minute is quite large. Frequently it is on the order of 500 per minute. When a given particle contacts the water its velocity decreases greatly at the instant of initial contact. On some occasions droplets falling into the water just after this given particle may strike the latter. The result is an agglomerate of several particles rather than individual discrete particles. The solution to this problem is to rapidly sweep the particles out of the area of the water surface in which they initially fall. This is accomplished in a facile manner by having the water in motion.

As mentioned previously water chamber 37 is mounted on scissors jack 62 so that the length of free fall of the droplets of fluid dispersion is adjustable. The optimum length of free fall will vary from one fluid dispersion composition to the next but is governed by two major considerations. If the length of free fall is excessive the droplet velocity is high enough so that the droplets flatten out upon impact with the surface of the water. The resulting solid fertilizer particles have a "pancake" shape rather than a droplet shape. Although there is nothing inherently wrong with "pancake" shaped particles, slow release fertilizer customers traditionally desire particles approximately spherical in shape.

If the length of free fall is too low the solid stream which leaves wire 55, for example, does not completely disintegrate into droplets prior to striking the surface of the water. The result is some spaghetti-like particles. Another problem which arises when the length of free fall is too low is that there is a greater tendency for several particles to come in contact with each other at the surface of the water resulting in agglomerates. This tendency is, of course, also dependent upon the motion of the water.

The optimum length of free fall will vary among different fluid fertilizer compositions but will normally be in the range of 2–36 inches. Usually the length of free fall will be 12–24 inches. Within these ranges the actual length employed will depend mainly upon the physical properties of the fluid dispersion droplets such as size, density, etc. As a general rule the larger the droplet, the shorter will be the length of free fall. Similarly, as the droplet density increases the optimum length of free fall decreases.

As described, any tendency of the droplets to flatten out when they strike the surface of the water can be reduced by decreasing the length of free fall of the particles. This tendency can also be reduced by adding a small amount of detergent to the body of water into which the droplets fall.

The slurry of solid fertilizer particles in water which drains out of water chamber 37 through line 60 is directed to vibrating screen 67 in order to separate the solid particles from the water. The water drains through the screen and is removed through line 68 while the solid particles roll off the lower edge of the screen into trough 69 from which they are removed via line 70. Rather than a vibrating screen any other convenient apparatus for separating solids from liquids can be employed.

The solid fertilizer particles recovered through line 70 will normally be slightly damp. Usually this will not be objectionable but if it is the solid particles can be further dried in any convenient manner such as, for example, blowing with air.

The water recovered from line 68 can if desired be recycled to water chamber 37 and be reused for solidifying additional droplets of fluid dispersion. Where this is done it will usually be necessary to provide means for cooling the recycle water. The cooling of the droplets of fluid dispersion raises the temperature of the water and if the water is to be reused it will eventually have to be cooled to maintain the temperature of the water far enough below the solidification temperature of the fluid dispersion to cause immediate solidification thereof.

It will also usually be found that a small amount of the fertilizer solids in the fluid dispersion, say 0.1%, dissolves in the water used to solidify the droplets. Actually it is surprising that only such a small amount dissolves when the high water solubility of conventional fertilizer solids is considered. If desired this dissolved fertilizer can be recovered from the water separated through line 68 by any conventional method such as evaporation, etc. An alternative procedure which actually prevents any dissolution in the water of the fertilizer solids in the fluid dispersion involves using water presaturated with the fertilizer solids present in the fluid dispersion. For example if the fluid dispersion in supply tank 21 contains urea as the only fertilizer solid the water entering water chamber 37 via line 59 would be a saturated aqueous urea solution. Where such a technique is employed economics will normally compel the recycling of the saturated aqueous urea solution subsequently recovered at line 68.

As described herein the apparatus shown in FIGURE 1 contains one fluid dispersion supply tank (indicated at 21) and three discharge lines (indicated at 23, 24, and 25) emanating therefrom and entering manifold block 27. In utilizing the method of the invention on a commercial scale a plurality of supply tanks would be used and each tank would most likely have more than three discharge lines.

The invention is illustrated more specifically by the following example.

*Example*

Into a mixing vessel equipped with heating and stirring means is charged 36 parts of a paraffin wax having a melting point of 129° F., a penetration at 77° F. of 18 dmm., and a viscosity at 210° F. of 38 S.U.S. The wax is heated to 240° F. after which 2 parts of polymerized wood rosin which had been roller milled to smaller than 200 mesh is mixed with the wax and the mixture is stirred until the rosin dissolves therein. Next a mixture of 60 parts urea and 2 parts of an oxidized petroleum asphalt having a softening point of 250° F. and a penetration at 770° F. of 0 is roller milled to a particle size of 200 mesh. This latter mixture is then charged to the wax-rosin mixture and the resulting 4 component mixture is stirred until the asphalt dissolves in the wax and until the urea is uniformly dispersed in the molten wax phase. The mixture is then cooled to 140° F. The resulting dispersion is fluid having about the consistency of melted chocolate.

The fluid dispersion is formed into solid particles using an apparatus essentially identical to that shown in FIGURE 1. Supply tank 21 has a capacity of about 1 gallon. Manifold block 27 is 5" x 5" x 15". The manifold block contains 4 cartridge type electric heaters positioned as shown in FIGURE 1. They maintain the block at an average temperature of 140–150° F. Holes 28, 29, and 30 have a diameter of 1½ inches. Discharge pipes 23, 24, and 25 are wrapped with heating wire and are screwed into holes 28, 29, and 30 respectively. The heating wire is adjusted to maintain the discharge pipes at about 140–150° F. Pipes 31, 32, and 33 have an inside diameter of ⅜ inch and are screwed into the bottom of the block. Nitrogen is bled into holes 28, 29, and 30 at their bottoms as shown in FIGURE 1. Nozzles 52, 53, and 54 have a discharge opening (e.g., item 58, FIGURE 3) of 0.086 inch diameter. Wires 55, 56, and 57 have a diameter of 0.018 inch. A water chambed of adjustable height, having the shape shown in FIGURE 1, and containing a body of water 3" deep at the deepest point (the front edge of water chamber 37) is positioned below the nozzles. The water temperature is 25° C. Water continuously enters and leaves the chamber at the rate of 5 gallons per minute. The discharge water passes onto a vibrating screen.

The fluid dispersion previously formed is charged to the supply tank. The nitrogen entering the holes in the manifold block bubbles up through the fluid dispersion and escapes from its surface.

Petcock 34 is opened slightly and fluid dispersion flows by gravity through the system and a continuous stream of fluid dispersion flows off of wire 55. This stream disintegrates almost immediately into a plurality of small droplets which drop into the water below. The distance between the lower end of wire 55 and the surface of the water below is 18 inches. Petcock 34 is opened until just prior to the point at which the stream leaving wire 55 will not disintegrate into droplets but which will fall into the water as a continuous stream. When petcock 34 is adjusted in this manner the continuous stream leaving wire 55 has a diameter of about 1/16 inch. After petcock 34 is properly adjusted, petcocks 35 and 36 are opened and adjusted in the same manner.

The droplets which fall into the water immediately solidify. They sink to the bottom of the water chamber and drain out of the chamber onto the vibrating screen. The water passes through the screen and the solid particles remain on the top of the screen whence they are collected. The solid particles have a droplet shape, i.e., approximately spherical with a maximum dimension of 3/32–1/16 inch. Since they are droplet shape no adjustments are made in the 18″ length of free fall. They are discrete slow release fertilizer particles.

The invention claimed is:

1. Method of preparing solid slow release fertilizer particles which comprises forming a fluid fertilizer composition comprising water soluble solid fertilizer finely dispersed in molten wax, flowing a narrow stream of said fluid fertilizer composition downwardly at elevated temperature toward a body of aqueous liquid saturated with respect to said solid fertilizer and maintained at a temperature below the solidification point of the composition, dropping the composition into said saturated aqueous liquid in the form of droplets, whereby the composition rapidly solidifies in particle form in the absence of any dissolution of said solid fertilizer in said aqueous liquid, and separating the particles from the saturated aqueous liquid.

2. Method according to claim 1 wherein said molten wax is molten petroleum wax.

3. Method according to claim 2 wherein the amount of said solid fertilizer in said fluid fertilizer composition is a major amount and the amount of the molten petroleum wax phase in said fluid fertilizer composition is a minor amount.

4. Method according to claim 2 wherein the amount of solid fertilizer in said fluid fertilizer composition is 50–80 parts and the amount of the molten petroleum wax phase in said fluid fertilizer composition is 15–49 parts.

5. Method according to claim 2 wherein the separated particles have a maximum dimension of 3/16 inch.

6. Method according to claim 1 additionally comprising continuously flowing aqueous liquid saturated with respect to said solid fertilizer into said body of saturated aqueous liquid, continuously withdrawing a stream of aqueous liquid from said body of saturated aqueous liquid at a locus at which said particles tend to accumulate, whereby the particles are carried by the stream, separating the particles from said stream, cooling the stream from which said particles have been separated and recycling the cooled stream to said body of saturated aqueous liquid.

References Cited by the Examiner
UNITED STATES PATENTS

| | | | |
|---|---|---|---|
| 1,538,730 | 5/1925 | Obersohn et al. | 18—2.7 |
| 2,790,201 | 4/1957 | Eilbracht et al. | 264—13 |
| 2,908,041 | 10/1959 | Kascher | 264—14 |
| 2,923,033 | 2/1960 | Baldwin et al. | 264—13 |
| 2,939,781 | 6/1960 | Gilliam | 264—13 |
| 3,023,171 | 2/1962 | Smith | 18—2.7 |
| 3,096,171 | 7/1963 | Woerther | 71—64 |

ALEXANDER H. BRODMERKEL, *Primary Examiner.*